INVENTOR
AUSTIN G. COOLEY
BY John J. Logan
ATTORNEY

July 7, 1959 A. G. COOLEY 2,894,064

HIGH SPEED FACSIMILE TRANSMISSION SYSTEMS

Original Filed Jan. 28, 1952 3 Sheets-Sheet 2

INVENTOR
AUSTIN G. COOLEY
BY John J. Rogan
ATTORNEY

July 7, 1959 A. G. COOLEY 2,894,064

HIGH SPEED FACSIMILE TRANSMISSION SYSTEMS

Original Filed Jan. 28, 1952 3 Sheets-Sheet 3

INVENTOR
AUSTIN G. COOLEY
BY John J. Rogan
ATTORNEY

United States Patent Office 2,894,064

Patented July 7, 1959

2,894,064

HIGH SPEED FACSIMILE TRANSMISSION SYSTEMS

Austin G. Cooley, New York, N.Y., assignor to Digital Control Systems, Inc., Beverly Hills, Calif., a corporation of California Continuation of application Serial No. 268,642, January 28, 1952. This application March 11, 1958, Serial No. 720,619

16 Claims. (Cl. 178—6.6)

This invention relates to intelligence transmission, and more particularly to arrangements for increasing the efficiency of use of available commercial facsimile communication channels.

A principal object of the invention is to provide arrangements for greatly increasing the transmission speed of facsimile systems using transmission channels of restricted frequency width but still remaining within predetermined distortion limits.

It has been proposed heretofore to employ at a facsimile recorder, a plurality of recorder elements such as styluses, arranged to scan across one dimension of a record sheet or web. With that arrangement, the styluses are spaced apart a distance equal to the length of each scanning line, so that as one stylus is leaving the scanning region, the next stylus enters the scanning region. As examples of such arrangements reference may be had to U.S. Patent No. 728,254 and my prior Patent No. 2,260,511.

However, such prior arrangements if operated at higher scanning speeds at the transmitter, require a correspondingly greater frequency width in the transmitting channel. Most facsimile systems utilize voice frequency telephone channels having a frequency band of the order of 300 to 2700 cycles, which channels are available at a moderate cost. This rather limited available channel width, therefore, sets a limit on the speed of transmission of about eighteen square inches of copy a minute for 100 lines per inch of scanning area.

In accordance with the present invention, the effective transmission rate is increased to about 24 square inches per minute without a corresponding increase in the channel width, by using a multiple scanning arrangement at the transmitter and a novel combination of signal storage and multiple recorder elements at the receiver.

Another object is to provide an improved combination of multiplex facsimile transmission, and a novel receiving system.

A feature of the invention relates to a facsimile transmitting and recording system, wherein two adjacent elemental area groups of the original copy are simultaneously scanned and transmitted by multiplex to a special recording-playback mechanism which, in turn controls a facsimile recording machine, whereby a greater amount of facsimile information can be transmitted and reproduced with a given channel capacity within prescribed distortion limits. As a result, it has been found possible more efficiently to use as a transmission link between the facsimile transmitter and facsimile recorder, commercially available voice frequency lines such as average telephone lines.

Another feature relates to a facsimile transmitting and recording system wherein adjacent elemental linear elements are simultaneously scanned and transmitted by multiplex to a special recording and playback mechanism which, in turn, controls a facsimile recording machine, whereby the transmitted signals representing adjacent simultaneously scanned linear elements can be stored and recorded in succession by separate recording elements whereby the subject matter can be reproduced with less distortion, and also a much greater area of subject matter can be reproduced in a given transmission period, but without correspondingly speeding up the scanning rate at the facsimile transmitter machine.

Other features and advantages not specifically enumerated, will be apparent after a consideration of the following detailed descriptions and the appended claims.

In the drawing, which shows by way of example certain preferred embodiments,

The prime purpose of the invention is to provide a system that can efficiently make use of the available band width of most voice circuits for transmitting and reproducing information. According to the invention, full use is made of the available voice-frequency band, for example the 900 to 2700 cycle band, by splitting it up into two bands, one between 900 and 1800 cycles and the other 1800 to 2700 cycles, and using a novel recording and playback arrangement to control the reproduction of the transmitted information. This method can be favorably compared with using a single transmitter system operating at higher speed. If the transmissions were speeded up to use a higher carrier frequency, say 2600 cycles (leaving room for a vestigial side-band), for practical reasons it would be possible to modulate down to 1300 cycles as the modulation frequency should not be above one-half of the carrier frequency because of the Kendall effect. Therefore, it would be possible to use modulation frequencies up to 1300 cycles.

On the other hand, by splitting the band it would be possible to use a modulating frequency of 900 cycles on the lower carrier and 600 cycle modulation on the upper channel, using a 2600 cycle carrier and cutting off at 2000 cycles. This dual channel system has an advantage on envelope delay distortion or phase distortion requirements. The phase distortion between 1300 cycles and 2700 cycles as required for a single channel is a great deal more than between 900 cycles and 1800 cycles or 2000 and 2700 cycles as required by the dual channel. The allowable delay distortion tolerance is inversely proportional to the modulation frequency and thus the allowable distortion in each of the dual channels is greater than in the single channel. In other words, one can increase the transmitting speed without degrading the quality of the recording. Actually one cannot have two bands come together at 1800 cycles. The lower side-band must have a vestigial side-band of 50 to 100 cycles above 1800 and the upper side-band must have a cut-off on the lower side before overlapping into the lower side-band. Therefore, the upper side-band will cut off around 2000 cycles and the lower side-band will extend up to about 1900 cycles. It has been found from experience that one can get as good a recording on the upper side-band between 2000 and 2700 cycles as with the lower between 900 and 1900.

In principle, therefore, the chief object of the invention is to provide a multiplex arrangement for a facsimile system that will enable the system to make greater use of a voice frequency channel than possible with single channel transmission systems for a given kind of copy and permissible distortion in transmission.

Figure 1:
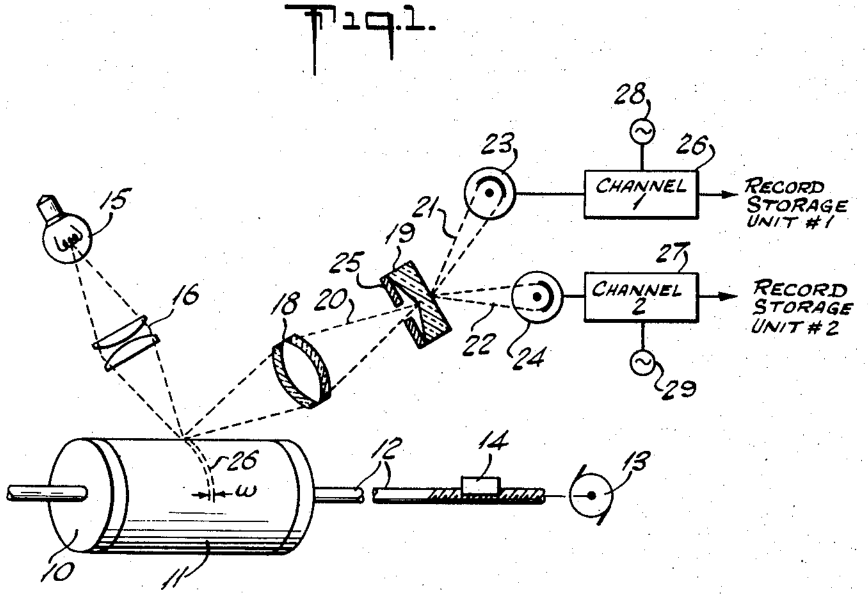
Fig. 1 is a schematic diagram of a facsimile transmitter according to the invention.
Figure 2:
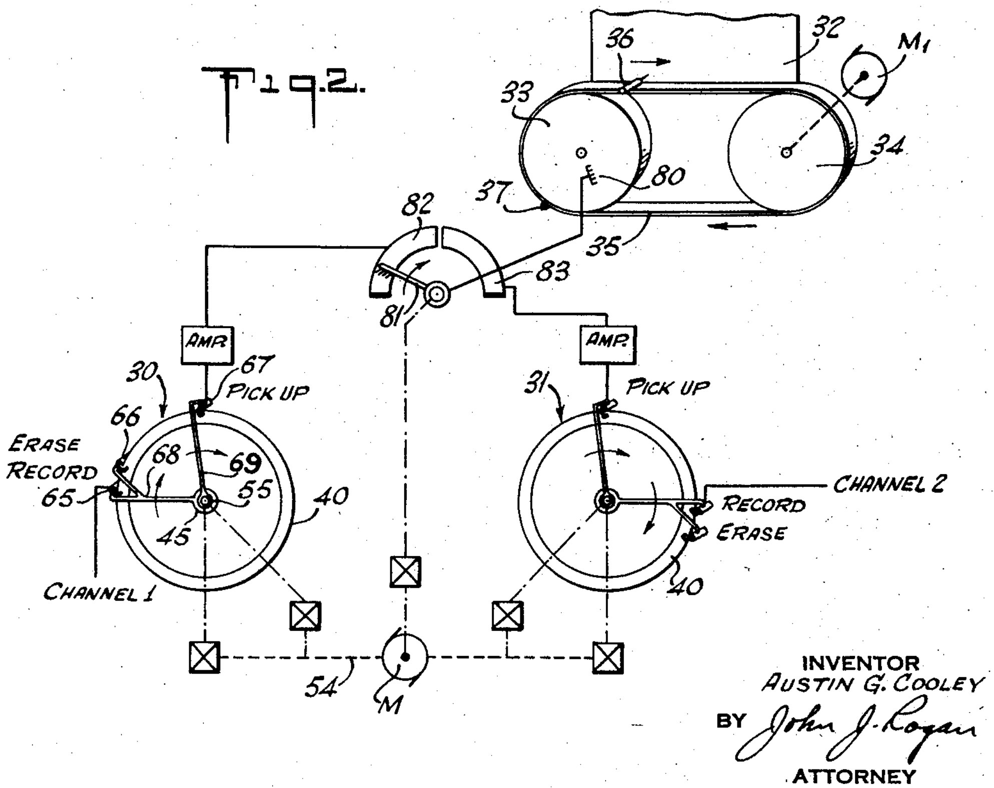
Fig. 2 is a schematic diagram of a facsimile receiver according to the invention.

Referring to Fig. 1 of the drawing, there is shown in generalized form, a facsimile transmitter comprising, for example, a rotatable drum 10 carrying the subject matter 11 which may be in the form of a sheet wrapped around and removably fastened to the drum. This subject matter is arranged to be scanned in successive elemental areas, for example of approximately .01 square inch, and along successive adjacent scanning lines. For this purpose, the drum 10 may be provided with the usual lead screw 12 driven at a fixed and accurately controlled speed from a suitable motor 13 through suitable gears (not shown). By a suitable half-nut 14 or the like the drum is indexed in the direction of its axial length at the same time that it is rotating. The subject matter 11 is illuminated in an elemental spot of width *w* by means of an exciter lamp 15 and a condenser lens system 16.

The light reflected from the successive elemental spots of the subject matter 11 is picked up by an objective lens 18 and a light-directing and beam-splitting unit 19, such as a prism for subdividing the reflected beam 20 into two equal but separate beams 21, 22. These subdivided beams cooperate with the respective pick-up units such as photoelectric cells 23, 24. The imaged scanned spot can be delineated by a suitable opaque apertured mask 25 located in front of the beam splitter 19. The elements 15—24 constitute what may be termed a scanning head, and if desired this head instead of being mounted stationarily with respect to the drum 10, can itself be mounted on a lead screw so as to feed it axially parallel to the length of the drum 10. In that case, the drum 10 need only rotate, it being understood that the axial movement of the scanning head is coordinated with the rate of rotation of the drum, as is well known in the art. With either of these arrangements, the subject matter 11 is scanned along adjacent scanning lines 26 each of width *w* of approximately 0.02 inch, each half ($w/2$) of the scanning line being continuously scanned by its respective cell 23, 24. The pitch of the lead screw 12 can be such that the axial feed of the drum, for each complete revolution thereof is *w*, and the subject matter 11 can thus be scanned in two adjacent lines or areas simultaneously, as required by the recording mechanism to be described.

The signal outputs of cells 23, 24, can be transmitted simultaneously over two separate transmission channels 26, 27 of any suitable kind known in the multiplex art. Thus, these channels may be separate carrier links or the channels may be derived from an ordinary telephone line having a working frequency range between 300 and 2700 cycles by splitting the circuit into two channels; for example, one below 1900 cycles and one above 2000 cycles. For example, channel 26 may be of any well known type which passes frequencies of between 900 and 1900 cycles per second; and channel 27 can be designed to pass frequencies of between 2000 and 2700 cycles per second. Thus, channel 26 may use an 1800 cycle oscillator 28 which is modulated by the signals from cell 23 to produce upper and lower side-band frequencies but the upper side-band frequencies can be suppressed in any well known manner. It has been found that satisfactory facsimile transmissions and reproductions can be effected with a frequency range of 900 cycles. Therefore, the channel 26 can be arranged to pass between 900 and 1900 cycles. Similarly the channel 27 can have an oscillator 29, for example, of 2700 cycles per second which is modulated by the signals from cell 24, and the channel 27 can be designed to pass only the lower side-band of 2000 to 2700 cycles, the upper side-band being suppressed in known manner. It will be understood, of course, that the invention is not limited to any specific band width or any particular form of multiplex channeling, and any other well known multiplexing may be used for simultaneously transmitting the output signals from the respective devices 23, 24.

The output of channel 26 is applied to a record storage unit 30, while the output of channel 27 is applied to a similar record storage unit 31. Preferably, these storage units are of the magnetic record type and one of them is disclosed in detail in Figs. 3–5 to be described hereinbelow. Suffice it to say, for the present, that each magnetic record unit comprises a recording head 65, an erasing head 66 and a pick-up head or reproducing head 67, all of which heads cooperate with a ring or annulus 40 of magnetizable material such as is well known in the telegraphone or magnetic sound recording art. The heads 65 and 66 can be mounted on an arm 68 attached to a hollow shaft 45 that is driven through suitable gearing from a motor shaft 54. Likewise, the pick-up head 67 is mounted on an arm 69 attached to a shaft 55 which is driven also from the same shaft 54 but through a higher gearing ratio than that which drives shaft 45. The recording, erase and pick-up heads may be of any well known design and they are arranged to rotate around and adjacent to the ring 40. It will be understood, of course, that the heads 65, 66, 67 are connected to their respective circuits by means of respective slip rings and brushes, which brushes may be suitably attached to the respective shafts 45 and 55 so as to make continuous contact while the heads are rotating. Thus, the erase and record heads may have a common slip ring **72*a* and a common brush 65*b*. The other terminal of head 65 can be connected to brush 65*a* and the other terminal of head 66 can be connected to brush 65*c*. Likewise the terminals of pick up heads 67 can be connected to respective brushes 71*a*, 71*b* riding on rings 73*a*, 73*b***.

The recording sheet or web 32 may be paid off from a suitable supply reel (not shown) and mounted adajacent the web are two metal wheels 33, 34, whose axes of rotation are spaced apart a distance substantially the same as the width of web 32. Surrounding the wheels 33, 34 is an endless metal band 35 carrying a plurality of facsimile recording elements or styluses 36, 37. Merely for explanatory purposes, the band 35 is shown carrying two styluses spaced apart along the length of the band so that one stylus can enter the recording region shortly after the preceding stylus leaves it. Preferably the band 35 is driven as described in detail in my U.S. Patent 2,717,822, dated September 13, 1955. As shown, it is driven at a speed bearing a predetermined relation to the storing mechanism by the motor M′. However, if desired, the wheel 34 may be driven at the required speed from motor M which drives the arms 68, 69, of each of the magnetic record units.

Electrical contact is made to the band and styluses through a suitable brush 80 engaging wheel 33. This brush is electrically connected to another brush 81 which is rotatable and engages a pair of commutator segments 82, 83 electrically connected respectively to the pick-up heads 67 through the two magnetic record units 30, 31, and through respective amplifiers. The commutator segments 82 and 83 are 90° in arcuate length so that the brush 81 rides on each segment, for example on segment 82, for the same length of time that each one the styluses is alternately traversing the scanning width of the recording sheet 32. Preferably each of the wheels 33, 34 has a circumference which approximates twice the width of the recording sheet 32 and the styluses 36 and 37 are also spaced apart on the band 35 by approximately the same length as that of the linear recording traverse and, as shown, equalling approximately one quarter the length of the band. Thus, the brush 81 traverses each of the segments 82, 83 in synchronism with the traversal of a stylus across the width of the sheet 32. Brush 81 is driven through suitable gearing from the motor M so that brush 81 rides over segment 82 during the same interval that stylus 36, for example, is scanning the web 32; and brush 81 rides over the segment 83 during the same interval that stylus 37 is scanning the web. Thus, the styluses are successively and recurrently energized by their respective magnetic records. The rotation of shafts 45 of both units 30 and 31 which carry the respective recording heads 65, are synchronized with the transmitting drum or scanning mechanism, so that each recording head 65 makes one complete revolution around its re-respective magnetic ring for each complete passage of its corresponding stylus across the width of web 32. However, the pick up heads 67 of both units rotate faster than the recording heads, for example four times as fast, so as to record a complete line stored on the circumference of the respective magnetic ring, and while the corresponding stylus is completing a traverse scan across the web 32. By means of a suitable cam forming part of each of the magnetic record units, and described in detail hereinbelow in connection with Figs. 3–5, each pick up head is lifted out of the path of its associated recording head except during the pick up cycle.

By the foregoing described arrangement, therefore, it is possible to record the continuous facsimile transmission over channels 26 and 27 even though each of the two styluses 36, 37 is only intermittently effective to record on web 32. It will be understood that the styluses are positioned in such a manner that recording lines on the sheet 32 are evenly spaced as the sheet is fed at a uniform rate.

Figure 3:
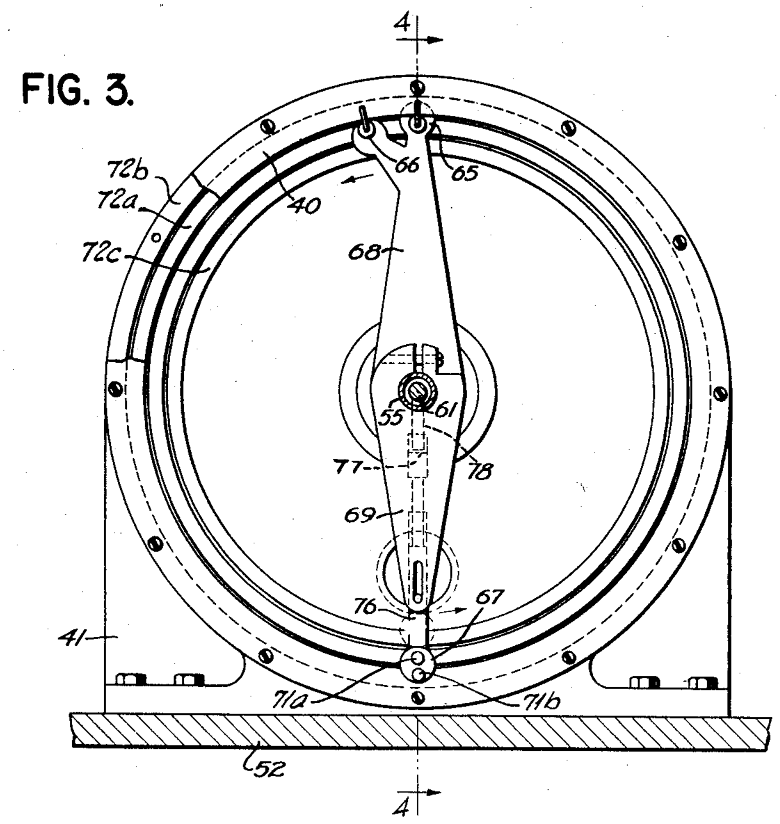
Fig. 3 is an end view, partly sectional, of one of the preferred forms of magnetic signal storage mechanisms shown schematically in Fig. 2.
Figure 5:
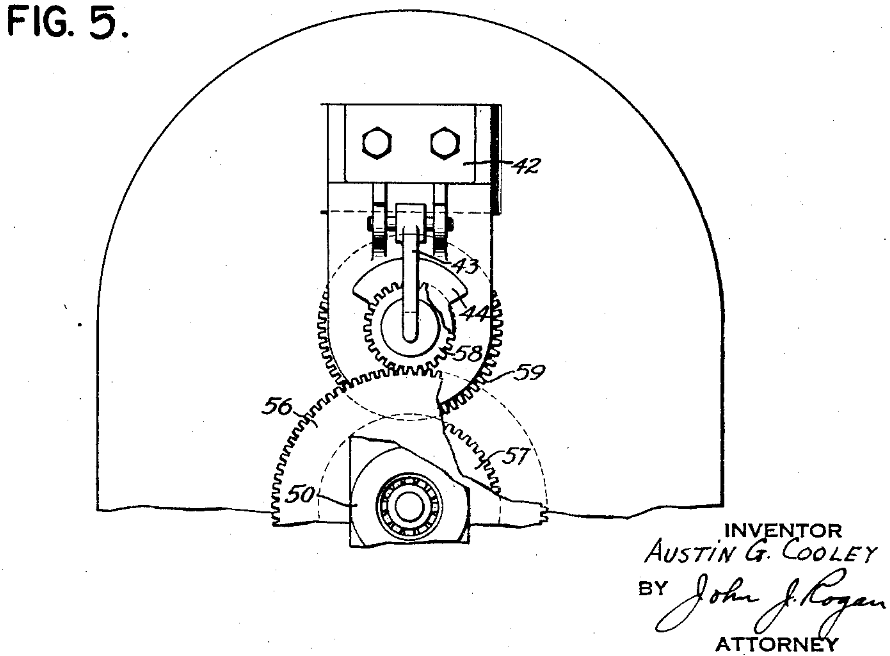
Fig. 5 is an end elevation of the storage mechanism showing the side opposite to that shown in Fig. 3.
Figure 4:
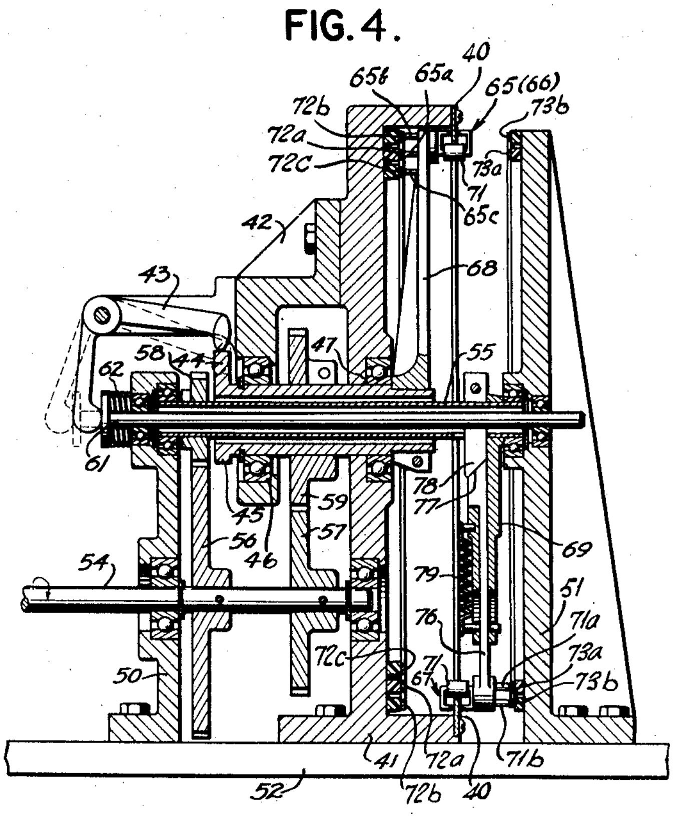
Fig. 4 is a longitudinal sectional view of the storage mechanism shown in Fig. 3, taken along the line 4—4 thereof.

Referring to Figs. 3, 4 and 5, a description will be given of a typical construction of one of the magnetic record units. Referring to these figures, the storage device is a magnetic recorder-reproducer in which the recording medium consists of a flat ring of tape coated with suitable magnetic material or it may be a steel ring 40 which is fixedly secured to the outer face of a cylindrical casing 41. On the opposite face of casing 41 from the magnetic storage element 40 is mounted an L-shaped frame 42 carrying a pivoted rocker arm 43. The inner end of the rocker arm 43 engages a rotary cam 44 mounted on a stub shaft 45 which rotates in the bearings 46, 47 carried by the supports 41 and 42. On either side of the cylindrical casing 41 are mounted vertical brackets or bearing supports 50 and 51 which may be bolted to a common base member 52. The vertical support 50 is provided with bearings for the drive shaft 54 and hollow shaft 55. The shaft 54 carries the driving gears 56, 57 meshing with the pinions 58, 59 respectively, on the shafts 55 and 45. The ratio of the gearing may be assumed to be such that the stub shaft 45 rotates at one-fourth the speed of the hollow shaft 55. A reciprocable rod 61 inside the hollow shaft 55 is oscillated by the rocker arm 43 against the compression of spring 62 and serves to actuate the reproducing or pick-up head of the magnetic recording device, as will be explained hereinbelow.

The magnetic storage arrangement comprises rotatable recording and erasing elements or heads 65, 66 and an independently rotated pick-up or reproducing head 67. The recording and erasing heads are carried on a rotatable arm 68 which is secured to the stub shaft 45 so that it rotates at the slower speed. The erasing head 66 is located in front of the recording head 65 and serves to condition the magnetic recording area for receiving signals which are stored by the magnetization of the tape or ring 40 as is well known in the art. The pick-up or reproducing head 67 is carried on a second rotatable arm 69 secured to the outer end of the hollow shaft 55 which rotates at a higher speed, say four times the rotative speed of the shaft 45 carrying the arm 68. Each recording and reproducing head consists of a U-shaped magnet carrying the usual coil 71, the ends of the magnet core embracing the inner edge of the magnetic tape or strip 40 along the same peripheral line. Electrical connections are made to the coils 71 through brushes bearing on the respective collector rings, as shown.

In the construction shown, the high speed arm 69 carrying the pick-up head 67 rotates continuously, the head being retractable to the position shown on the dotted lines in Fig. 3 in order to clear the elements 65 and 66 and to effect reproduction during only one out of every four revolutions; namely, during the period when the recording stylus 36 is traversing the recording area. As shown, the reproducing or pick-up head 67 is mounted on a reciprocable bar 76 in the arm 69, the inner end of bar 76 being provided with a sloping cam surface 77 cooperating with the cam member 78 attached to the reciprocable rod 61 whereby the axial movement of the rod 61 projects and retracts the arm 76 against the tension of the helical spring 79. The member 78 projects through a suitable slot in the wall of hollow shaft 55 to allow the member 78 to be moved longitudinally and thus to convert its longitudinal motion into vertical displacement of the arm 69. Therefore, it will be evident that the time during which the pick-up head 67 is moved outward to the position shown in full lines in Figs. 3 and 4, in which it is operative to pick up the stored signals on the ring 40, is controlled by the shape and angular position of the cam 44 which controls the positions of the element 67 through the rocker arm 43, push rod 61 and cam 78.

In operation the recording head 65 rotates in synchronism with the scanning mechanism of the remote transmitter, and is effective to record or store the received signals continuously on the magnetic tape or ring 40. The pick-up or reproducing element 67 is rotated four times as fast as the recording head and during every fourth revolution becomes operative to transfer the stored signals to the recording stylus which during this period is traversing the recording web 32. Therefore, a continuous train of signals from the line is stored in the signals storage device and transferred at a higher rate intermittently to the facsimile recorder so that a single intermittently operated stylus can be used to record each respective continuous train of facsimile signals. Therefore, since two or more such trains are transmitted simultaneously over the multiplex channels, each stylus can operate intermittently and the overall line transmission time is speeded up without a corresponding increase in the required transmission band width, and there is effected an average rate of recording equal to the average rate of the transmitter scanning.

Various changes and modifications can be made in the disclosed embodiments without departing from the spirit and scope of the invention.

This application is a continuation of application Serial No. 268,642, filed January 28, 1952.

What is claimed is:

1. A facsimile system having in combination, a facsimile transmitter for simultaneously scanning different elemental areas of a subject matter to produce a respective plurality of simultaneous facsimile signals for each set of simultaneously scanned elemental areas, respective multiplex transmission channels for said signals for transmitting said signals simultaneously to a facsimile receiver, said receiver having a plurality of recorder elements arranged to scan in alternate sequence successive respective linear elements of a recording surface, respective signal storage means for said recorder elements, and means to energize successively and recurrently each of said recorder elements under control of its respective storage means.

2. A facsimile system having in combination, a facsimile transmitter for simultaneously scanning different elemental areas of a subject matter to produce a respective plurality of simultaneous facsimile signals for each set of simultaneously scanned elemental areas, respective multiplex transmission channels for said signals for transmitting said signals simultaneously to a facsimile receiver, said receiver having a plurality of recorder elements arranged to scan in alternate sequence respective successive linear elements of a recording surface, respective signal storage means for said channels and each having a respective movable member, and a commutator synchronized with the movement of said elements and with the movement of said members for connecting each of said storage means successively in circuit with said facsimile recorder elements.

3. A facsimile system having in combination, a facsimile transmitter for simultaneously scanning adjacent elemental spots of each scanned line of a subject matter to produce a plurality of simultaneous respective facsimile signals for each set of simultaneously scanned elemental areas, a plurality of multiplexed transmission channels for said facsimile signals, a facsimile recorder having a plurality of facsimile recording elements, means to move said recording elements so that they scan alternate but adjacent linear elements on a recording surface with two adjacent such elements corresponding to a single scanning line on said subject matter, means to drive said recorder elements at a linear speed which is a multiple of the line scanning speed at said transmitter, a plurality of signal storage means one for each of said recorder elements and each connected to the receiving end of a respective one of said multiplexed channels, and means to render each of said storage means successively effective on the corresponding one of said recorder elements.

4. A facsimile system according to claim 3 in which means are provided for applying said facsimile signals from each of said adjacent spots to respective multiplex transmission channels, each of said storage means including a recording head which is continuously connected to a respective one of said channels, and a pick-up head which is recurrently connected to a corresponding one of said facsimile recorder elements in synchronism with its scanning of said recording surface.

5. A facsimile system according to claim 4 in which the recording head and the pick-up head of each storage means are driven at different but predetermined speeds.

6. A facsimile system according to claim 3 in which means are provided for applying the facsimile signals from adjacent scanned spots to respective multiplex transmission channels, each of said storage means comprising an annular magnetic record blank, a pick-up head, a recorder head which is continuously connected to a respective facsimile transmission channel, and means to rotate the recorder head and the pick-up head of each storage means at different but fixed relative speeds around the associated annular record blank.

7. A facsimile system according to claim 6 in which each of said storage means includes an erase head rotatable in unison with the associated recorder head.

8. A facsimile system having in combination, a plurality of multiplexed transmission channels, separate means to store under control of respective signals received over respective multiplexed channels a plurality of simultaneous series of facsimile signals representing respective different elements of a subject matter, a similar plurality of separate facsimile recorder elements, means to operate said facsimile recorder elements to scan alternately and recurrently a recording surface in respective linear elements, a similar plurality of storage mechanisms for said series of facsimile signals, and means to render each of said storage mechanisms alternately and recurrently effective on a respective one of said facsimile recorder elements.

9. A facsimile system according to claim 8 in which each of said storage mechanisms includes a recorder head which is continuously energized by a respective series of said plurality of series of facsimile signals and a pick-up head one for each of said facsimile recorder elements, and means for driving the pick-up head at a higher speed than the associated recorder head.

10. A facsimile system according to claim 9 in which the pick-up head of each storage unit is synchronized in movement with the scanning movement of the corresponding facsimile recorder element.

11. A facsimile system according to claim 8 in which each of said storage mechanisms includes a recorder head which is continuously energized by a respective series of said plurality of series of facsimile signals, pick-up heads one for each of said facsimile recorder elements, means for driving each pick-up head at a higher speed than the associated recorder head, commutator means for recurrently and periodically connecting the pick-up head of each storage mechanism to a respective facsimile recorder, and means for synchronizing the movement of each pick-up head with the scanning movement of the corresponding facsimile recorder element and with the commutating cycle of said commutator means.

12. A facsimile system having in combination, a facsimile recorder provided with a plurality of separate recording styluses, means for repeatedly transversing said styluses in succession across a recording surface, separate facsimile storage means one for each of said styluses, means to record on each of said storage means under control of facsimile signals received from respective multiplexed channels, and commutator means for connecting the storage means and the corresponding stylus in circuit whereby said surface is substantially continuously scanned by said styluses acting in succession.

13. A facsimile system comprising in combination, a plurality of storage mechanisms for storing simultaneously respective series of facsimile signals received over respective multiplexed transmission channels each series being derived from a corresponding strip of a scanned line of a subject matter, each of said storage mechanisms including a record device and an erase device which erase device is effective immediately ahead of the record device, a plurality of facsimile recording elements, and commutator means for rendering said recording elements effective from said storage mechanisms alternately.

14. A facsimile recorder for operation in conjunction with a plurality of multiplexed facsimile receiving channels, comprising in combination, a plurality of facsimile recorder elements one for recurrently scanning alternate lines of a recording surface, the other for recurrently scanning intevening alternate lines of said surface, a plurality of signal storage devices each to be continuously energized from a corresponding multiplex channel and each having a moving signal transducer element, and a commutator operated in fixed time relation with said facsimile recorder elements and with said transducer elements.

15. A facsimile recorder according to claim 14 in which said facsimile recorder elements are carried by an endless band and are spaced apart a distance approximately the width of the area to be scanned, said commutator means including a rotatable brush continuously electrically connected to said recorder elements, and said commutator means having a plurality of segments each connected to a respective one of said storage mechanisms.

16. A facsimile recorder according to claim 15 in which a single drive motor is connected to operate the transducer elements and the commutator brush and the said band.

References Cited in the file of this patent

UNITED STATES PATENTS

| | | |
|---|---|---|
| 1,771,360 | Thurm | July 22, 1930 |
| 1,938,990 | Woodward | Dec. 12, 1933 |
| 1,945,636 | Baird | Feb. 6, 1934 |
| 2,202,605 | Schroter | May 28, 1940 |
| 2,236,502 | Goldsmith | Apr. 1, 1941 |
| 2,245,286 | Marzocchi | June 10, 1941 |
| 2,260,511 | Cooley | Oct. 28, 1941 |
| 2,321,611 | Moynihan | June 15, 1943 |
| 2,335,047 | Bennett | Nov. 23, 1943 |
| 2,353,631 | Bliss | July 18, 1944 |
| 2,355,369 | Finch | Aug. 8, 1944 |
| 2,517,265 | Wald | Aug. 1, 1950 |
| 2,690,473 | Cooley | Sept. 28, 1954 |